(12) United States Patent
Krause et al.

(10) Patent No.: US 7,964,176 B2
(45) Date of Patent: Jun. 21, 2011

(54) PROCESS AND APPARATUS FOR THERMALLY INTEGRATED HYDROGEN GENERATION SYSTEM

(75) Inventors: Curtis L. Krause, Houston, TX (US); Kevin H. Nguyen, Missouri City, TX (US); Bhaskar Balasubramanian, Houston, TX (US); Yunquan Liu, Katy, TX (US); Jeroen Valensa, Muskego, WI (US); Michael J. Reinke, Franklin, WI (US); Mark G. Voss, Franksville, WI (US); Todd M. Bandhauer, Racine, WI (US)

(73) Assignees: Chevron U.S.A. Inc., San Ramon, CA (US); Modine Manufacturing Company, Racine, WI (US)

( * ) Notice: Subject to any disclaimer, the term of this patent is extended or adjusted under 35 U.S.C. 154(b) by 1130 days.

(21) Appl. No.: 11/092,555

(22) Filed: Mar. 29, 2005

(65) Prior Publication Data

US 2006/0225349 A1 Oct. 12, 2006

(51) Int. Cl.
*F28F 1/00* (2006.01)
*C01B 3/26* (2006.01)

(52) U.S. Cl. ....... 423/652; 165/181; 165/177; 48/198.1; 48/127.9

(58) Field of Classification Search ............. 48/127.9; 165/177; 423/652
See application file for complete search history.

(56) References Cited

U.S. PATENT DOCUMENTS

| | | | |
|---|---|---|---|
| 3,909,299 A | 9/1975 | Corrigan | |
| 4,238,204 A | 12/1980 | Perry | |
| 4,690,695 A | 9/1987 | Doshi | |
| 4,909,808 A | 3/1990 | Voecks | |
| 5,256,174 A | 10/1993 | Kai et al. | |
| 5,435,836 A | 7/1995 | Anand et al. | |
| 5,516,344 A | 5/1996 | Corrigan | |
| 5,669,960 A | 9/1997 | Couche | |
| 5,753,010 A | 5/1998 | Sircar et al. | |
| 5,861,137 A | 1/1999 | Edlund | |
| 6,063,161 A | 5/2000 | Keefer et al. | |
| 6,077,323 A * | 6/2000 | Nataraj et al. | 48/198.1 |
| 6,126,908 A | 10/2000 | Clawson et al. | |
| 6,153,152 A | 11/2000 | Ruhl et al. | |
| 6,245,303 B1 | 6/2001 | Bentley et al. | |
| 6,406,523 B1 | 6/2002 | Connor et al. | |
| 6,471,744 B1 | 10/2002 | Hill | |

(Continued)

FOREIGN PATENT DOCUMENTS

| | | |
|---|---|---|
| EP | 0 578 218 A2 | 1/1994 |
| EP | 1 167 282 A1 | 1/2002 |
| FR | 2 805 805 A1 | 9/2001 |
| WO | WO 02/062463 | 8/2002 |
| WO | WO 02/088022 A1 | 11/2002 |

OTHER PUBLICATIONS

Search Report from PCT/US2006/010319, mailed Feb. 5, 2008.

(Continued)

*Primary Examiner* — Melvin C Mayes
*Assistant Examiner* — Melissa Stalder
(74) *Attorney, Agent, or Firm* — Merchant & Gould (57) ABSTRACT

Relates to a process and apparatus that improves the hydrogen production efficiency for small scale hydrogen production. According to one aspect, the process provides heat exchangers that are thermally integrated with the reaction steps such that heat generated by exothermic reactions, combustion and water gas shift, are arranged closely to the endothermic reaction, steam reformation, and heat sinks, cool natural gas, water and air, to minimize heat loss and maximize heat recovery. Effectively, this thermally integrated process eliminates excess piping throughout, reducing initial capital cost.

26 Claims, 3 Drawing Sheets

U.S. PATENT DOCUMENTS

| | | | |
|---|---|---|---|
| 6,497,856 | B1 | 12/2002 | Lomax, Jr. et al. |
| 6,623,719 | B2 * | 9/2003 | Lomax et al. ............ 423/652 |
| 7,494,518 | B2 | 2/2009 | Reinke |
| 2002/0132147 | A1 * | 9/2002 | Gao ............................ 429/19 |
| 2003/0044331 | A1 | 3/2003 | DeBellis et al. |
| 2004/0187386 | A1 | 9/2004 | Wangerow et al. |
| 2005/0241232 | A1 * | 11/2005 | Reinke et al. ................ 48/76 |

OTHER PUBLICATIONS

Written Opinion of the ISR from corresponding International Application No. PCT/US2006/010319.

Supplementary European Search Report from EP 06 75 8177, mailed Nov. 19, 2009.

* cited by examiner

PROCESS AND APPARATUS FOR THERMALLY INTEGRATED HYDROGEN GENERATION SYSTEM

BACKGROUND OF THE INVENTION

1. Field of the Invention

The present invention relates to a process for the generation of hydrogen and an apparatus having a catalytic combustor, reforming reactor and water gas shift reactor integrated in a single vessel assembly.

2. Description of the Related Art

Hydrogen is being considered as an alternative fuel for transportation and power generation. However, hydrogen has a low volumetric density making the storage and transport of hydrogen both difficult and costly. Thus, there is a need in the industry for efficient, small scale, onsite hydrogen generation.

Hydrogen may be generated in a number of ways. The technology of choice for large, refinery scale hydrogen production is steam reforming of methane (natural gas) followed by a water gas shift reaction.

In steam reformation, methane and hydrogen are reacted to form a reformate that includes carbon monoxide and hydrogen. Then, in a subsequent water gas shift reaction, carbon monoxide and water can be reacted to form carbon dioxide and hydrogen.

This is a mature technology and is one of the more cost effective methods for producing hydrogen from natural gas for smaller-scale distributed hydrogen generation. However, when used to produce a transportation fuel, distributed hydrogen generation is not cost competitive with gasoline on a dollar per gallon basis. In order for distributed hydrogen generation via steam methane reforming to be practical and cost competitive, the hydrogen production efficiency must be improved.

The main contributor to the low efficiency of smaller-scale steam methane reforming is heat loss. Heat loss is greatly exacerbated when the process is scaled down from large refinery plant capacity hydrogen production (>100,000 kg/day) to production levels on the order of several hundreds of kg/day or less. The increased heat losses at small scale contribute directly to low production efficiency, higher operating costs, and ultimately a higher cost of hydrogen.

The production efficiency problem has been addressed to a certain extent through re-design of heat exchangers, modified catalyst formulations and improved heat management. For example, it is known in the art to embed cooling coils and other heat exchangers within reactor vessels (catalytic combustor, reforming reactor and water gas shift) for the purpose of directing heat flows out of the reactor to an external heat exchanger, reactor or temperature control system. This approach typically requires extensive piping, a separate heat exchange fluid, and active flow controls. It is also known to recover otherwise un-utilized heat by combusting or oxidizing a waste gas from a purification step or fuel cell in a catalytic combustor. However, such features also typically employ separate reactor vessels, extensive piping and controls. Moreover, the heat recovery and efficiencies of such systems are generally not maximized because of heat loss and added parasitic losses due to complex active control systems.

Additionally, the initial capital equipment cost to build a small scale steam methane reforming facility contributes to the process not being competitive. Further, these designs have typically not been able to be manufactured at low cost because they require elaborate balance of plant components for active control and monitoring of process parameters. Thus, the improvements have not advanced the technology far enough to make it commercially feasible.

SUMMARY OF THE INVENTION

The present invention satisfies the objectives of providing a process and apparatus that improves the hydrogen production efficiency.

According to an aspect of the present invention, the process and apparatus utilize heat exchangers that thermally integrate the reaction steps such that heat generated by exothermic reactions, e.g., combustion and water gas shift, are arranged closely to the endothermic reaction, e.g., steam reformation, and heat sinks, e.g., cool methane, water and air, to minimize heat loss and maximize heat recovery. Effectively, this thermally integration eliminates excess piping throughout, reduces initial capital and operating costs, provides built-in passive temperature control, and improves hydrogen production efficiencies.

According to another aspect of the present invention, the process is thermally neutral, such that a supplemental fuel such as methane is no longer needed in order to achieve high reforming efficiency and conversion. This directly translates to lower operating costs.

According to another aspect of the present invention, the surface areas and flow configurations of the heat exchangers are designed such that they serve the dual purposes of heat recovery/pre-heating and passive temperature control of process streams. For example, a heat exchanger can preheat a steam and natural gas feed for the reforming reactor with heat derived from a heated reformate while yielding an optimum inlet reformate temperature for the water gas shift reactor. Also, a heat exchanger can cool the reformate to a desired pressure swing adsorption unit operating temperature and utilize this heat to convert water to saturated steam and/or to preheat a combustion reactant such as air. This thermal pinching/passive temperature control technique not only simplifies and adds robustness to the process controls, but also eliminates control valves and various other moving parts throughout the apparatus as well as the need for external cooling. Thus, according to an aspect of the present invention, the only active control parameters of the process are setting and adjusting the air flow to the combustor and the natural gas and water flows to the reforming reactor. The uniqueness of this process flow design significantly drives down the capital cost of the system.

According to another aspect of the present invention, an annular design in a single vessel allows for operating the combustor and reforming reactor at two different pressure regimes without sacrificing heat loss.

In another aspect of the present invention, by directly coupling the heat generating combustion reaction with the endothermic steam reforming reaction, heat transfer is balanced between the two reactions, heat recovery is maximized, control of steam reforming temperature is simplified, and the apparatus has fewer parts and less connecting piping.

According to another aspect of the present invention, there are at least three heat transfers that are utilized in the process and apparatus. First, is a first heat transfer in order to preheat air and/or a combustion feed gas with heat derived from a shifted reformate. A second heat transfer is directed to heating water, and optionally a methane-containing gas, with heat derived from an exhaust from a combustor and an unshifted reformate. A third heat transfer produces a cooled unshifted reformate by transferring heat to a reforming reactant.

Process for preparing hydrogen in a fuel processor assembly comprising: (a) preheating air with a shifted reformate to form pre-heated air and cooled shifted reformate; (b) combusting the preheated air and the combustion feed gas in a catalytic combustor to form exhaust; (c) heating water with the exhaust of the catalytic combustor to form heated water; (d) heating a methane-containing gas and the heated water with an unshifted reformate to form steam, a heated methane-containing gas and a cooled unshifted reformate; (e) reforming the steam and the heated methane-containing gas in a reforming reactor to form the unshifted reformate; (f) reacting the cooled unshifted reformate in the water gas shift reactor according to a water gas shift reaction to form the shifted reformate.

An apparatus for producing hydrogen comprising an annular arrangement comprising an annulus comprising a combustor, an intermediate annulus comprising a reforming reactor and a water gas shift reactor disposed radially inward from the intermediate annulus.

DETAILED DESCRIPTION OF THE PREFERRED EMBODIMENTS

Embodiments of the present invention provide a process and apparatus to produce hydrogen via steam reforming of methane. The reforming reaction is thermally integrated with a catalytic combustion and water gas shift reactions to improve thermal efficiencies and hydrogen production. In the hydrogen generation process of the present invention, methane is converted to hydrogen. The process involves two primary reactions, steam reformation and water gas shift, to produce hydrogen from methane and water. As used herein, the term "water" generally includes, liquid water, combinations of liquid water and steam, and steam.

Steam methane reforming ("SMR") comprises an endothermic reaction requiring 57 kW of heat and proceeds according to the following equation:

$$CH_4 + H_2O \rightarrow CO + 3H_2$$

The water gas shift reaction of the SMR product comprises an exothermic reaction generating heat and proceeds according to the following equation:

$$CO + H_2O \rightarrow CO_2 + H_2$$

Once the hydrogen has been converted in the steam reformation and water gas shift steps, the process gas can be sent to any suitable hydrogen purification unit. A purification unit disposed downstream of the fuel processor receives a flow of reformate and produces a flow of hydrogen-enriched reformate by removing impurity therefrom. Hydrogen can be separated from the impurities in the reformate using a variety of technologies. By way of example, a number of purification processes separate hydrogen from impurities through selective adsorption by passing the hydrogen-containing stream under pressure through a column or bed of adsorbent material. Selective adsorption can be performed with adsorptive materials that adsorb hydrogen and allow a hydrogen-depleted stream to pass or with materials that adsorb impurity and allow a hydrogen-enriched stream to pass. In either case, it is highly preferred that the adsorbent materials be capable of regeneration through techniques such as pressure swing, temperature swing and the like.

In some embodiments, purification is carried out in a pressure swing adsorption ("PSA") unit having adsorptive materials that selectively adsorb impurities and allow a hydrogen-enriched reformate to pass. In the PSA unit, by-products (CO and $CO_2$) and unconverted $CH_4$ in the process gas are selectively adsorbed and hydrogen is allowed to pass. When the PSA unit is fully saturated with by-products, it can be regenerated using a pressure using technique and a small amount of hydrogen. A mixture of CO, $CO_2$, $C_4$, and hydrogen exiting the PSA unit during regeneration cycles is typically referred to as off-gas. The fuels in the off-gas can be combusted to produce heat that can be used to preheat reactant streams for the steam reforming reaction.

Suitable PSA units include those known in the art for separating hydrogen from a process stream, such as are described in U.S. Pat. No. 4,238,204 issued Dec. 9, 1980 to Perry; U.S. Pat. No. 4,690,695 issued Sep. 1, 1987 to Doshi; U.S. Pat. No. 5,256,174 issued Oct. 26, 1993 to Kai et al.; U.S. Pat. No. 5,435,836 issued Jul. 25, 1995 to Anand et al.; U.S. Pat. No. 5,669,960 issued Sep. 23, 1997 to Couche; U.S. Pat. No. 5,753,010 issued May 19, 1998 to Sircar et al.; and U.S. Pat. No. 6,471,744 issued Oct. 29, 2002 to Hill, the descriptions of which are incorporated herein by reference. In some embodiments, the purification unit will comprise a compact PSA. Suitable compact PSAs can include a rotary-type PSA such as are described in U.S. Pat. No. 6,063,161 issued May 16, 2000 to Keefer et al. and in U.S. Pat. No. 6,406,523 issued Jun. 18, 2002 to Connor et al., the descriptions of which are incorporated herein by reference. Compact PSAs having rotary elements are commercially available from Questair Technologies, Inc. of Burnaby, Canada.

An embodiment of the invention is a process for preparing hydrogen in a fuel processor assembly comprising a reforming reactor, a water gas shift reactor, a catalytic combustor and the associated heat exchangers for heat recovery. This integrated process is adapted to be coupled with a pressure swing adsorption unit. The process flow is illustrated in FIG. 1.

Figure 1:
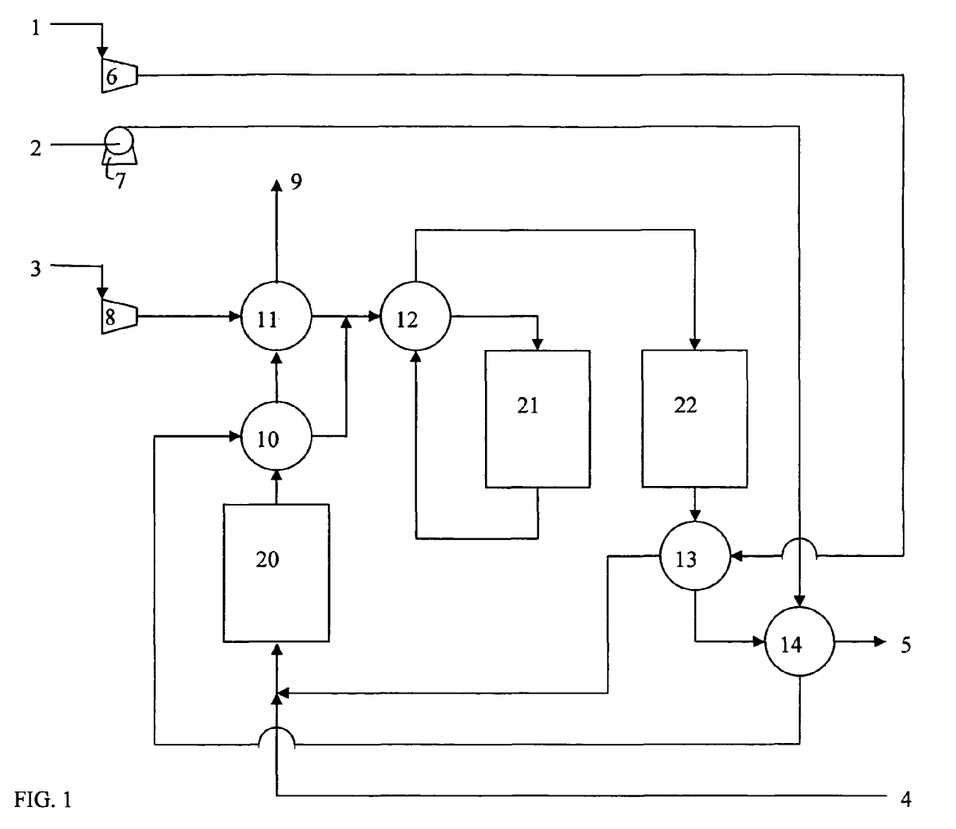
FIG. 1 is a schematic process flow diagram of an embodiment of the present invention.

As illustrated in FIG. 1, air 1 is supplied to the catalytic combustor 20 via the air blower 6. The air is preheated in heat exchanger 13 with shifted reformate 5 exiting a water gas shift reactor 22. Preferably, air 1, initially at ambient conditions, is preheated by heat exchanger 13 to about 300° C. and is supplied by air blower 6 at a pressure of at least about 1 psig. More preferably, the air 1 is preheated to about 350° C. at about 3 psig.

In an embodiment of the present invention, air blower 6 can include any suitable air blower, but is preferably one capable of supplying about 1800 kg/day of air at a pressure of at least 1 psig.

In an embodiment of the present invention, suitable heat exchangers can include, but are not limited to, coils, fins, shell-and-tube, plate and annular-type heat exchangers. A detailed description of a suitable annular-type heat exchanger may be had by reference to US 2003/0044331 A1, published Mar. 6, 2003 by Debellis et al., the description of which is incorporated herein by reference.

The preheated air and combustion feed gas 4 are fed to the catalytic combustor 20 and can be combined prior to being fed to the catalytic combustor 20. The combustion feed gas 4 can comprise any suitable combustion reactants, including the byproduct of a hydrogen purification process. Examples include permeate or non-permeate of a membrane separation or an off-gas from a PSA unit. Preferably, the combustion feed gas 4 is off-gas from a PSA unit. Typical off-gas from a PSA unit will contain $CH_4$, $H_2$, CO constituents at a pressure range of about 1-2 psig and at a temperature range of 50-75° C.

In the catalytic combustor 20, the preheated air and the combustion feed gas 4 are combusted over an oxidation catalyst to form an exhaust gas 9. Preferably, the exhaust gas 9 is at a temperature of at least about 760° C., more preferably at a temperature of at least about 800° C.

Suitable catalytic combustors can include, but are not limited to, catalyst coated metal combustors, catalyst coated ceramic combustors, and packed-bed pelletized combustors.

Water 2 is supplied to reforming reactor 21 via pump 7. The water is preheated in heat exchanger 14 with shifted reformate 5 exiting heat exchanger 13. Preferably, water 2 is initially at ambient conditions and preheated by heat exchanger 14 to about 85° C. and supplied by pump 7 at about 120 psig. More preferably, the water 2 is preheated by heat exchanger 14 so that the water 2 becomes saturated steam at about 120 psig.

Pump 7 can comprise any suitable pump, particularly one that is capable of supplying about 520 kg/day of water at a pressure of at least 100 psig.

Preferably, heat exchanger 14 is sized such that the shifted reformate exiting the apparatus is at an optimum temperature for a PSA unit or other suitable purification unit.

The preheated water exiting heat exchanger 14, preferably in the form of saturated steam, is then passed through heat exchanger 10. In heat exchanger 10 the preheated water is heated with combustion exhaust 9 from the catalytic combustor 20. The heated water exiting heat exchanger 10 is in the form of super-heated steam at a pressure of about 120 psig.

Methane-containing gas 3 is supplied to the reforming reactor 21 via the compressor 8. The methane-containing gas is preheated in heat exchanger 11 with exhaust 9 exiting heat exchanger 10. The methane-containing gas 3 is initially at ambient conditions and is then compressed in compressor 8 to about 120 psig. The methane-containing gas is somewhat heated by virtue of its compression and is then heated in heat exchanger 11 to at least about 200° C.

Preferably, the methane-containing gas 3 is provided in the form of any suitable natural gas.

Compressor 8 can be any suitable compressor and is preferably a compressor capable of supplying up to 150 kg/day of methane at a pressure of about 120 psig.

Next, the heated water, preferably in the form of super-heated steam, and preheated methane-containing gas are mixed to form a reforming reactor feed gas. This reforming reactor feed gas is preheated in heat exchanger 12 with the unshifted reformate exiting the reforming reactor 21. Preferably, the reforming reactor feed gas is at a desired steam reformation temperature of at least about 700° C. and a pressure of about 120 psig. More preferably, the reforming reactor feed gas is at least about 740° C. and still more preferably is about 770° C.

Heat exchanger 12 is sized and configured to provide a desired steam reforming feed gas temperature as well as to cool the exiting unshifted reformate from reforming reactor 21 to a temperature suitable for the water gas shift catalyst within reactor 22.

The reforming reactor feed gas then undergoes a steam reformation reaction according to the following equation:

$$CH_4 + H_2O \rightarrow CO + 3H_2$$

In an embodiment of the present invention, suitable reforming reactors can include any suitable reactor vessel with a steam reforming catalyst. In some embodiments, the reforming reactor comprises an annular shaped reactor that is disposed adjacent and radially inward from catalytic combustor 20. In such an embodiment, heat derived from the catalytic combustor can be used to heat the reforming reactor.

The unshifted reformate from reforming reactor 21 passes through heat exchanger 12 to provide heat to the reforming reactor feed gas and to cool the unshifted reformate to a temperature appropriate for the water gas shift reaction to be conducted in water gas shift reactor 22.

The unshifted reformate then undergoes a water gas shift reaction according to the following equation:

$$CO + H_2O \rightarrow CO_2 + H_2$$

Suitable water gas shift reactors can include, but are not limited to, catalyst coated metal reactors, catalyst coated ceramic reactors, and packed-bed pelletized reactors.

As previously described, the shifted reformate exiting the water gas shift reactor 22 passes through heat exchanger 13 in order to preheat the air 1. The shifted reformate then exits heat exchanger 13 and preheats the water 2 in heat exchanger 14. Preferably, the shifted reformate exiting heat exchanger 14 is at a temperature suitable for use as a feed to a PSA or another suitable purification unit disposed downstream from heat exchanger 14.

In another embodiment of the present invention, a particular design for practicing elements of embodiments of the process of the present invention is provided. The design incorporates a catalytic combustor, a reforming reactor and a water gas shift reactor in an integrated annular arrangement, preferably inside a cylindrical vessel. A cut out two dimensional schematic illustration of such an apparatus design is shown in FIG. 2.

Figure 2:
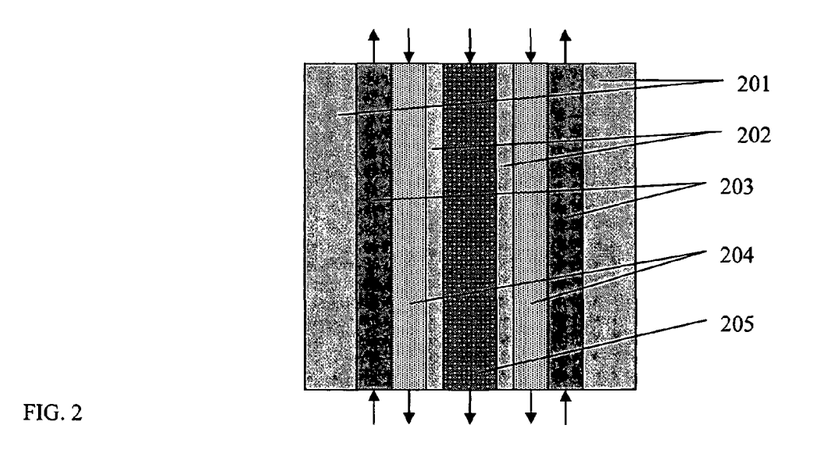
FIG. 2 is a schematic two dimensional illustration of the annular design of an embodiment of the present invention.

Referring to FIG. 2, the design incorporates layers of insulation 201, 202. The outer layer of insulation 201 can be applied either external or internal to the vessel wall. The insulation covers an outer annulus section 203, which houses a catalytic combustor. Preferably, the combustor comprises heat exchanger style fins which are coated with combustion catalyst. Examples of suitable oxidation catalysts include noble metals such as platinum, palladium, rhodium, and/or ruthenium on an alumina wash coat on a monolith, extrudate, pellet or other support. Non-noble metals such as nickel or cobalt have also been used. Other wash coats such as titania, zirconia, silica, and magnesia have also been cited in the literature. Many additional materials such as lanthanum, cerium, and potassium have been cited in the literature as "promoters" that improve the performance of the oxidation catalyst. In an embodiment where the hydrocarbon fuel is natural gas, a suitable catalyst will include a palladium oxide dispersed on a support material comprising a relatively inert refractory inorganic oxide such as alumina, which is optionally impregnated with stabilizers, promoters or other additives.

Moving towards the center, the next annulus section 204 houses a reforming reactor comprising a steam reforming catalyst. Preferably, the reforming reactor contains fins which are coated with the steam reforming catalyst. The reforming catalyst(s) may be in any form including pellets, spheres, extrudates, monoliths, as well as common particulates and agglomerates. Conventional steam reforming catalysts are well known in the art and can include nickel with amounts of cobalt or a noble metal such as platinum, palladium, rhodium, ruthenium, and/or iridium. The catalyst can be supported, for example, on magnesia, alumina, silica, zirconia, or magnesium aluminate, singly or in combination. Alternatively, the steam reforming catalyst can include nickel, preferably supported on magnesia, alumina, silica, zirconia, or magnesium aluminate, singly or in combination, promoted by an alkali metal such as potassium. Where the reforming reaction is preferably a steam reforming reaction, the reforming catalyst preferably comprises rhodium on an alumina support. Suitable reforming catalysts are commercially available from companies such as Cabot Superior Micropowders LLC (Albuquerque, N.M.) and Engelhard Corporation (Iselin, N.J.).

Section 205 houses a water gas shift reactor comprising a water gas shift catalyst. Preferably, the water gas shift reactor is in the form of a water gas shift catalyst on a monolithic structure that is insulated from the reforming reactor annulus 204 by an insulation layer 201. A water gas shift catalyst can be disposed within the catalyst bed to convert steam and carbon monoxide to hydrogen and carbon dioxide. As note above, providing for a water gas shift reaction within the catalyst bed can be beneficial because carbon monoxide, in addition to being highly toxic to humans, is a poison to many fuel cell catalysts. The maximum level of carbon monoxide in the hydrogen-rich reformate should be a level that can be tolerated by fuel cells, typically below about 50 ppm. In addition, there is growing demand for higher purity reformate streams that have carbon monoxide concentrations below about 25 ppm, preferably below about 15 ppm, more preferably below 10 ppm, and still more preferably below about 5 ppm. In a preferred embodiment, the unshifted reformate is allowed to react adiabatically within section 205, without any external cooling. As used herein, "external cooling" is intended to refer to cooling means that are used to transfer heat from a component or reactor within the apparatus to a location external to the apparatus.

Water gas shift reactions generally occur at temperatures of from about 150° C. to about 600° C. depending on the catalyst used. Low temperature shift catalysts operate at a range of from about 150° C. to about 300° C. and include for example, copper oxide, or copper supported on other transition metal oxides such as zirconia, zinc supported on transition metal oxides or refractory supports such as silica, alumina, zirconia, etc., or a noble metal such as platinum, rhenium, palladium, rhodium or gold on a suitable support such as silica, alumina, zirconia, and the like. Higher temperature shift catalysts are preferably operated at temperatures ranging from about 300° C. to about 600° C. and can include transition metal oxides such as ferric oxide or chromic oxide, and optionally include a promoter such as copper or iron silicide. Suitable high temperature shift catalysts also include supported noble metals such as supported platinum, palladium and/or other platinum group members. Suitable water gas shift catalysts are commercially available from companies such as Cabot Superior Micropowders LLC (Albuquerque, N.M.) and Engelhard Corporation (Iselin, N.J.).

As schematically illustrated in FIG. 2, a preferred process flow for the annular vessel is such that the reforming reactor process flow is counter to the combustor process flow. In some embodiments, the water gas shift process flow is also counter to the combustor process flow. An annulus providing a return flow of unshifted reformate to the inlet of the water gas shift reactor (not shown) can be included.

In some embodiments, combustion preferably takes place at a pressure of less than about 5 psig, preferably 1-2 psig. The combustion occurs on the combustor fin surfaces when a mixture of air and combustible fuel are introduced. The annular design allows heat generated by this highly exothermic reaction to be transferred directly through the walls separating the combustor fins and the reforming reactor fins. The transferred thermal energy supplies the necessary heat for the endothermic steam reforming reaction continuously from inlet to outlet. By directly coupling the heat generating combustion reaction with the endothermic steam reforming reaction, heat transferred is balanced between the two reactions, heat recovery is maximized, control of steam reforming temperature is simplified, and the assembly has less parts and connecting piping. The unshifted reformate exiting the reforming reactor is cooled by heat transfer with the reforming reactants and then travels through the water gas shift monolith where additional hydrogen is produced and the majority of carbon monoxide is converted to carbon dioxide. Steady temperature in the reforming reactor fin section is maintained by controlling the rate of combustion on the combustor side. Preferably, the rate of combustion is maintained by controlling the air flow rate to the combustor. The flow rates of the various feed streams, air, methane-containing gas and combustion feed gas, are controlled by means such as changing blower, pump, and compressor flows, automated or manual control valves, a system controller that automates control over the flows of combustion air, and fuel and water to the reforming reactor, and other similar controllers. Other control means will be apparent to one skilled in the art and are included within the scope of the present invention.

The annular vessel is intended to be coupled with a PSA unit or another suitable purification unit. A PSA unit is typically operated at 100-200 psig. Preferably, the steam reforming fin section operates in this high pressure range to take advantage of the lower compression power needed to compress the steam reforming feeds, methane and water, relative to the compression power that would be required to compress the reformate stream if the reforming reactor were operated at a low pressure. Thus, the annular design in a single vessel allows for operating the combustor and reforming reactor at two different pressure regimes without substantial heat loss.

The annular vessel also preferably comprises heat exchangers to maximize heat recovery. An embodiment that incorporates the necessary reactors and heat exchangers within a common housing or vessel is schematically illustrated in FIG. 3.

Figure 3:
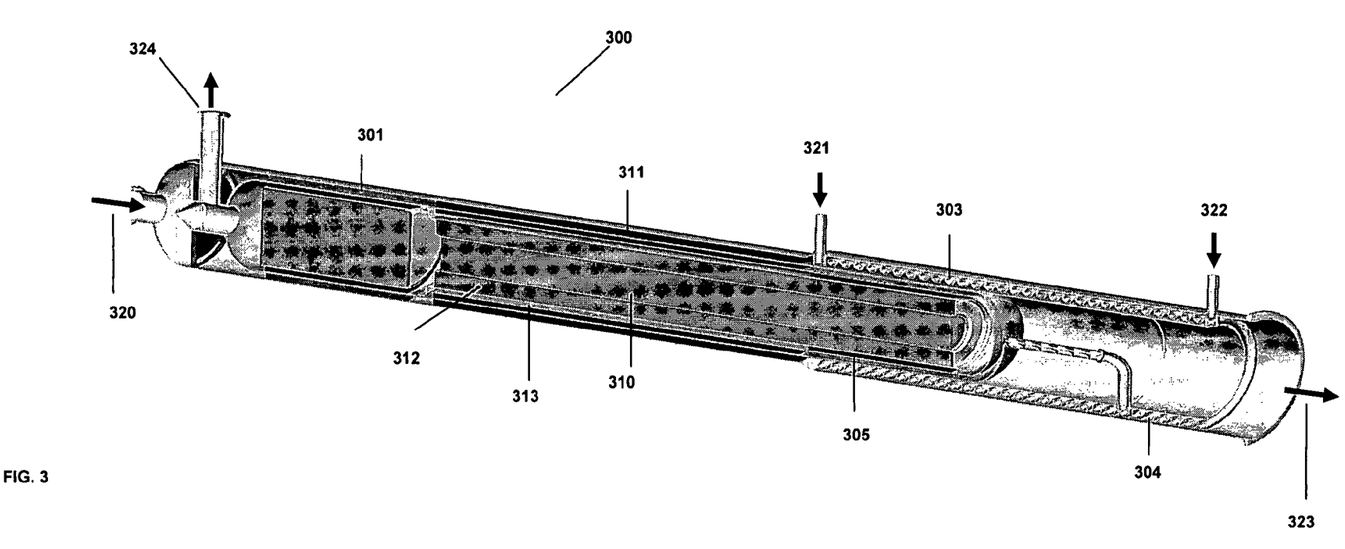
FIG. 3 is a schematic view of a vessel design according to an embodiment of the present invention.

Referring to FIG. 3, air and combustion feed gas, preferably, off-gas from a PSA unit, can be fed into the vessel 300 via inlet 320. A water inlet 321 and methane-containing gas inlet 322 are also provided. In the embodiment illustrated in FIG. 3, heat exchangers 301, 303, 304, 305 are provided in the vessel. Heat exchanger 301 is adapted to preheat the air/combustion feed gas mixture with heat derived from the reformate exiting the water gas shift reactor 310. A shifted reformate outlet 324 is provided and an optional heat exchanger (not shown) can be utilized external to vessel 300 to preheat water with heat derived from the reformate exiting the vessel 300 via outlet 324. Heat exchanger 303 is adapted to receive water from water inlet 321 and to preheat the water with heat derived from the exhaust from combustion reactor 311. Heat exchanger 304 is adapted to preheat the methane-containing gas with heat derived from the combustion exhaust. It should be noted that heat exchangers 304 and 305 can be combined into a common or integrated heat exchanger for generating steam and/or preheating a methane-containing gas for reforming. A combustion exhaust outlet 323 is provided. Heat exchanger 305 is adapted to further heat a reforming reactor feed gas to the desired reforming reaction temperature with heat derived from the unshifted reformate exiting a reforming reactor 313 and to cool the unshifted reformate to a temperature suitable for the water gas shift reaction to occur in reactor 310. Insulation 312 is adapted to cover and insulate the water gas shift reactor. Preferably, the orientation of vessel 300 is vertical such that the top end is the combustion exhaust outlet 323.

Figure 4:
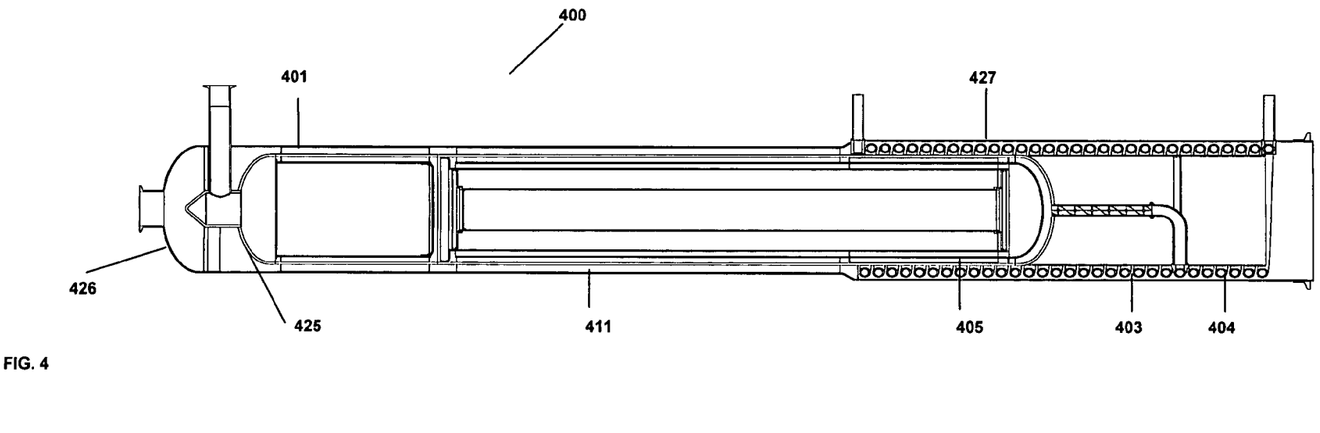
FIG. 4 is a schematic view of a vessel design according to an embodiment of the present invention.

FIG. 4 schematically illustrates an example of an embodiment of a vessel 400 according to the present invention. As illustrated, the vessel 400 has a lower outer shell 426 having an outer diameter of about 6.81 inches and an upper outer shell 427 having an outer diameter of about 7.75 inches. The vessel 400 also has an inner, pressure vessel 425 having an outer diameter of about 6 inches and a length of about 37.3 inches. Heat exchanger 405 is adapted to preheat a reforming reactor feed gas and is preferably about 6.8 inches in length. Heat exchanger 401 is adapted to preheat a air/combustion feed gas mixture with reformate exiting a water gas shift reactor and is preferably about 6.8 inches in length. The preheated air/combustion feed gas mixture is combusted in combustion reactor 411 and that the exhaust from the combustion reaction flows over heat exchanger 403 and heat exchanger 404. Heat exchanger 403 is adapted to pre-heat water with the heat of the combustion exhaust. Heat exchanger 404 is adapted to preheat a methane-containing gas fed with combustion exhaust. Heat exchanger 403 and heat exchanger 404 come together and the gases are mixed in an in-line static mixer before entering the top of the pressure vessel. The combined coil of heat exchangers 403 and 404 is preferably about 18.9 inches in length.

Figure 5:
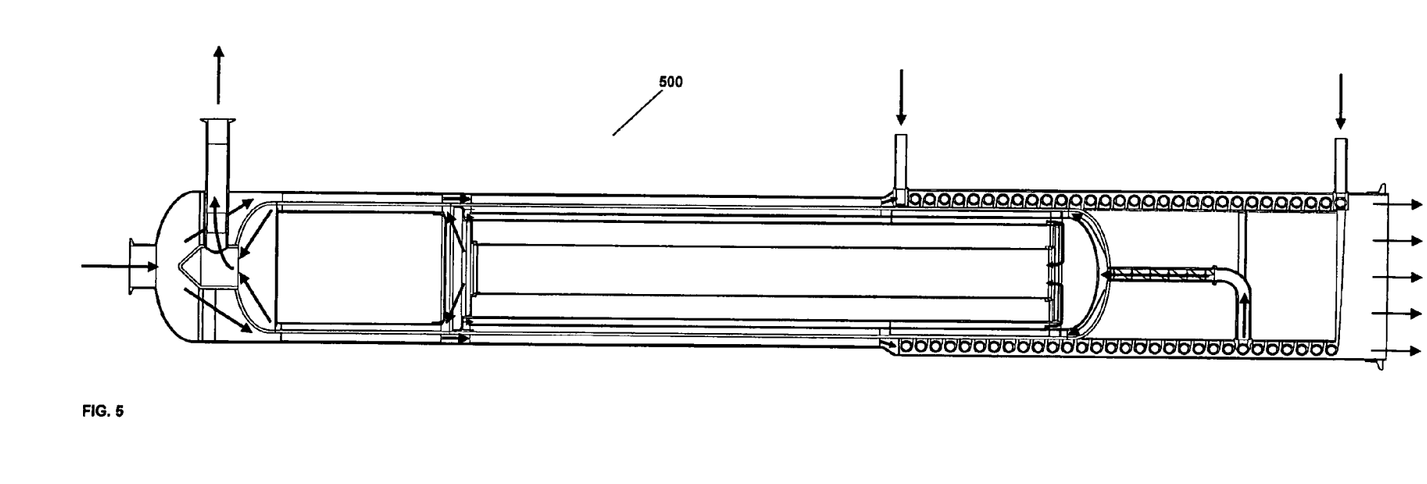
FIG. 5 is a schematic illustration of a vessel designed according to an embodiment of the present invention.

FIG. 5 schematically illustrates a process flow of an embodiment of a vessel 500 according to the present invention.

The vessels of FIG. 3, FIG. 4 and FIG. 5 illustrate embodiments wherein heat exchangers are used to thermally integrate exothermic reactions steps such as the combustion and water gas shift reactions with the endothermic reaction steps and those process stages where cooling of the process stream is required. The heat exchange elements are selected, sized and configured within a process and apparatus of the present invention to minimize heat loss and maximize heat recovery. Effectively, embodiments such as a thermally integrated vessel, eliminate excess piping throughout and reduce initial capital cost. Furthermore, reductions in heat loss equate to higher hydrogen production efficiency and lower operating costs.

Additionally, embodiments such as a thermally integrated vessel can be thermally neutral so that supplemental fuel, such as methane, is no longer needed in order to achieve high reforming efficiency and conversion. This directly translates to lower operating costs.

In the embodiments of the process and apparatus of the present invention, the surface areas and flow configurations of the heat exchangers are designed such that they serve dual purposes, heat recovery/pre-heating and passive temperature control of process streams. This thermal pinching/passive temperature control technique not only simplifies and adds robustness to the process controls, but also eliminates control valves and various other moving parts throughout the process. Thus, the only necessary active control parameters of the process are air flow to the combustor, natural gas and water flows to the reforming reactor. Moreover, no active cooling of process streams such as through the monitoring of temperatures and adjusting flows of a coolant and/or heating fluid is required to maintain a given reaction or process step within the desired temperature range. The uniqueness of the process and apparatus design significantly drives down the capital cost of the system.

Although only preferred embodiments are specifically illustrated and described herein, it will be appreciated that many modifications and variations of the present invention are possible in light of the above teachings and within the purview of the appended claims without departing from the spirit and intended scope of the invention.

What is claimed is:

1. A process for preparing hydrogen in a fuel processor assembly comprising:
   (a) combining air and a combustion feed gas;
   (b) preheating air and the combustion feed gas in a heat exchanger with a shifted reformate to form pre-heated air, pre-heated combustion feed gas, and cooled shifted reformate;
   (c) combusting the preheated air and the pre-heated combustion feed gas in a catalytic combustor to form exhaust;
   (d) heating water with the exhaust of the catalytic combustor to form heated water;
   (e) pre-heating a methane-containing gas with the exhaust of the catalytic combustor to form pre-heated methane-containing gas;
   (f) heating the pre-heated methane-containing gas and the heated water with an unshifted reformate to form a heated methane-containing gas and a cooled unshifted reformate;
   (g) reforming steam and the heated methane-containing gas in a reforming reactor to form the unshifted reformate; and
   (h) reacting the cooled unshifted reformate in a water gas shift reactor according to a water gas shift reaction to form the shifted reformate.

2. The process according to claim 1, wherein the pre-heated methane-containing gas and the heated water are combined prior to heating in a heat exchanger.

3. The process according to claim 1, further comprising feeding the shifted reformate to a pressure swing adsorption unit.

4. The process according to claim 1, wherein the combustion feed gas comprises an off-gas from a pressure swing adsorption unit.

5. The process according to claim 1, further comprising heating the water with shifted reformate to form saturated steam prior to heating the water with the exhaust of the catalytic combustor.

6. The process according to claim 1, wherein the methane-containing gas is supplied in the form of natural gas.

7. The process according to claim 1, wherein reforming the heated methane-containing gas and steam in the reforming reactor is controlled in part by adjusting the air flow to the combustor.

8. The process according to claim 7, wherein reforming the heated methane-containing gas and steam in the reforming reactor is further controlled by adjusting the flow of methane-containing gas to the reforming reactor and the water flow to the reforming reactor.

9. The process according to 1, wherein the reformate is reacted in the water gas shift reactor without external cooling.

10. The process according to claim 1, wherein the combustor and the reforming reactor are operated at different pressures.

11. The process according to claim 10, wherein the reformate exiting the water gas shift reactor is at a pressure suitable for use as a feed to a pressure swing adsorption unit.

12. The process according to claim 1, further comprising heating the reforming reactor with combustion heat from the catalytic combustor.

13. An apparatus for producing hydrogen comprising a combustor, a water gas shift reactor, a reforming reactor and at least three heat exchangers arranged in a manner to carry out the process of claim 1.

14. The apparatus of claim 13, wherein the reforming reactor is controlled by adjusting the air flow to the combustor, the methane flow to the reforming reactor and the water flow to the reforming reactor.

15. An apparatus for producing hydrogen comprising an annular arrangement comprising an outer annulus comprising a combustor, an intermediate annulus comprising a reforming reactor and a water gas shift reactor disposed radially inward from the intermediate annulus.

16. The apparatus of claim 15, further comprising a layer of insulation between the intermediate annulus and the water gas shift reactor.

17. The apparatus of claim 15, wherein the water gas shift reactor is capable of reacting an unshifted reformate without external cooling.

18. The apparatus of claim 15, wherein heat generated by a combustion reaction in the annulus comprising the combustor can be transferred through at least one wall to the reforming reactor.

19. The apparatus of claim 15, wherein heat derived from a shifted reformate exiting the water gas shift reactor can be transferred through at least one wall to at least one combustion reactant.

20. The apparatus of claim 15, wherein heat derived from a reformate exiting the intermediate annulus can be transferred through at least one wall to a reforming reactant.

21. The apparatus of claim 15, further comprising flow control means for adjusting an air flow to the combustor, a methane flow to the reforming reactor and a water flow to the reforming reactor.

22. The apparatus of claim 15, further comprising at least one controller for adjusting an air flow to the combustor, a methane flow to the reforming reactor and a water flow to the reforming reactor.

23. The apparatus of claim 15, wherein the at least three heat exchangers comprise:
   a first heat exchanger adapted to preheat an air/combustion feed gas mixture with a reformate exiting the water gas shift reactor;
   a second heat exchanger adapted to heat water with an exhaust from the combustor; and
   a third heat exchanger adapted to preheat a reforming reactor feed gas with reformate exiting the reforming reactor.

24. The apparatus of claim 23, wherein the combustor, the reforming reactor, the water gas shift reactor, and the at least three heat exchangers are arranged within a single vessel.

25. The apparatus of claim 15, wherein the intermediate annulus and the annulus comprising a combustor are capable of being operated at different pressures.

26. The apparatus of claim 25, wherein the intermediate annulus and the water gas shift reactor can be operated at a pressure to produce a shifted reformate suitable for use as a feed to a pressure swing adsorption unit.

* * * * *